G. B. GRIFFIN.
HORSE-COLLAR.
No. 184,075. Patented Nov. 7, 1876.
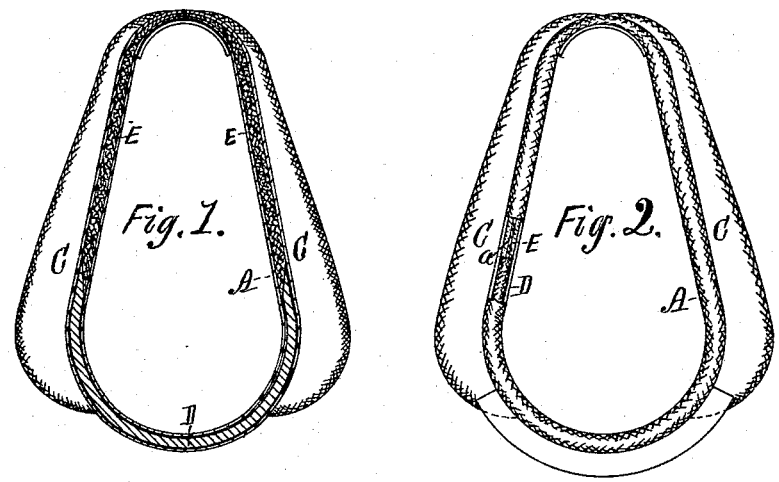

UNITED STATES PATENT OFFICE.

GEORGE B. GRIFFIN, OF CHICAGO, ILLINOIS.

IMPROVEMENT IN HORSE-COLLARS.

Specification forming part of Letters Patent No. 184,075, dated November 7, 1876; application filed October 7, 1876.

*To all whom it may concern:*

Be it known that I, GEORGE B. GRIFFIN, of Chicago, in the county of Cook and State of Illinois, have invented new and useful Improvements in Horse-Collars; and I do hereby declare the following to be a full, clear, and exact description thereof, which will enable others skilled in the art to which my invention appertains to make and use the same, reference being had to the accompanying drawing, forming part of this specification, in which—

Figure 1 represents a front sectional elevation of a horse-collar embodying my invention; and Fig. 2 represents a front elevation of the same, with a portion of the rim broken away, showing a part of the filling.

Like letters of reference indicate like parts.

My invention relates to that class of horse-collars adjusted to encircle the neck of a horse; and the object of my invention is to so construct the rim of the collar as to allow the pads to adjust themselves more perfectly to the shoulder of the horse when in the act of moving forward or drawing a load. To that end my invention consists in providing the lower part of the rim with a filling of solid rubber, or of a section of rubber tubing, through which is passed a piece of rope, in combination with a filling of straw, or other equivalent material, arranged within the upper part of the rim, as is hereinafter more fully described.

In the drawing, A represents the rim proper, which is made from a strip of leather commonly used for that purpose, of the proper width, and stitched together at its edges, so as to form a hollow tube, and which is bent in the proper shape to encircle the neck of the horse.

C C represent the pads, which are disconnected from each other, and are permanently stitched to the rim A, in proper position to bring them against the shoulders of a horse.

D is a filling of solid india-rubber, which is closely fitted within the lower or circular part of the rim, and extends upward, at each end, from one-third to one-half the length of the collar and is made less in diameter, or wedge-shaped at its ends, as shown in Fig. 1.

E is a filling of straw or other suitable material, which is inserted within the upper parts of the rim above the filling D, and so as to wedge between the pointed ends of the latter and the inner surface of the rim.

The arrangement of the filling D and E is such as to expand the rim sufficiently to cause it to retain an annular shape laterally, and to present a smooth external surface, while the elasticity of the filling D allows the rim to yield sufficiently to cause the pads to adjust themselves to the position of the shoulders of the horse, as the shoulders are alternately moved forward by the forward movement of the horse. The same results may be accomplished by making the filling D of a piece of rubber tubing, and passing a rope, *a*, through the cavity in the tubing, and extending it to the top of the collar, and then filling the cavity between the rope and inner surface of the rim with straw or other equivalent material.

Permanently attached to the upper end of one of the pads, and to the rim on one side of the collar, are suitable straps, (not shown,) which buckle to the opposite pad and end of the rim in the usual manner.

It is found by actual use of horse-collars in which the entire rim is filled with straw that, when subjected to continual strain or long use, the filling will first break at the junction of the pads on the circular part of the collar, and thereby cause the leather to break, which renders the collar liable to injure the shoulders of the horse, and which is obviated by my said construction of horse-collars.

I am aware that horse-collars have been made with a flexible rim provided with a filling composed of india-rubber tubing or of solid rope, with the pads adjustable thereon; but such I do not claim.

Having thus described my invention, what I claim as new, and desire to secure by Letters Patent, is—

1. In a horse-collar, the combination, with the pads C C, of the rim A, filled with rubber and straw, substantially as specified.

2. In a horse-collar, the rim A, provided with the rubber filling D, rope *a*, and straw E, arranged substantially as shown, for the purpose stated.

GEORGE B. GRIFFIN.

Witnesses:
N. C. GRIDLEY,
N. H. SHERBURNE.